(12) United States Patent
Komai et al.

(10) Patent No.: US 8,837,975 B2
(45) Date of Patent: Sep. 16, 2014

(54) POWER SUPPLY CIRCUIT, IMAGE FORMING APPARATUS INCORPORATING SAME, AND POWER SUPPLY METHOD TO SUPPLY VOLTAGE TO IMAGE FORMING APPARATUS

(71) Applicants: Kunihiro Komai, Osaka (JP); Akira Yashiro, Osaka (JP); Motohiro Kawanabe, Osaka (JP); Takayuki Kawamoto, Osaka (JP)

(72) Inventors: Kunihiro Komai, Osaka (JP); Akira Yashiro, Osaka (JP); Motohiro Kawanabe, Osaka (JP); Takayuki Kawamoto, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 99 days.

(21) Appl. No.: 13/693,162

(22) Filed: Dec. 4, 2012

(65) Prior Publication Data

US 2013/0164017 A1 Jun. 27, 2013

(30) Foreign Application Priority Data

Dec. 22, 2011 (JP) ................................. 2011-281749

(51) Int. Cl.
*G03G 15/00* (2006.01)
(52) U.S. Cl.
USPC ............................................. 399/88; 399/89

(58) Field of Classification Search
USPC ........................ 399/50, 88, 89; 363/19, 21.13
See application file for complete search history.

(56) References Cited

U.S. PATENT DOCUMENTS 8,503,900 B2 * 8/2013 Inukai .............................. 399/88
8,538,282 B2 * 9/2013 Inukai .............................. 399/50

FOREIGN PATENT DOCUMENTS

| JP | 7-227087 | 8/1995 |
| JP | 2007-034092 | 2/2007 |
| JP | 2001-186761 | 7/2007 |
| JP | 2008-043097 | 2/2008 |

* cited by examiner

*Primary Examiner* — Hoang Ngo
(74) *Attorney, Agent, or Firm* — Harness, Dickey & Pierce, P.L.C.

(57) ABSTRACT

A power supply circuit includes a voltage regulator to which a first high voltage is supplied, to operate at constant voltage and regulate the supplied first high voltage, and a first rectifier circuit to which the first high voltage is supplied, connected in parallel to the voltage regulator, to rectify the supplied first high voltage for output as a first DC voltage. When the first high voltage is a pseudo-alternating-current (AC) voltage consisting of two types of high voltages that alternate, the voltage regulator regulates each of the two different types of the voltages to output a desired pseudo-AC voltage.

12 Claims, 4 Drawing Sheets

POWER SUPPLY CIRCUIT, IMAGE FORMING APPARATUS INCORPORATING SAME, AND POWER SUPPLY METHOD TO SUPPLY VOLTAGE TO IMAGE FORMING APPARATUS

CROSS-REFERENCE TO RELATED APPLICATION

This patent application is based on and claims priority pursuant to 35 U.S.C. §119 to Japanese Patent Application No. 2011-281749, filed on Dec. 22, 2011, in the Japan Patent Office, the entire disclosure of which is hereby incorporated by reference herein.

BACKGROUND

1. Field

The present invention generally relates to a power supply circuit, an image forming apparatus, and a method for supplying a power to the image forming apparatus, and more particularly, to a power supply circuit that outputs a direct current voltage and a pseudo-alternating current voltage.

2. Description

At present, with the increased digitalization of information, image processing devices such as printers used for outputting computerized information, facsimiles, scanners used for computerizing documents, have become essentials. These image processing devices are often constituted as multi-function peripherals (MFP) and used as printers, facsimiles, scanners, and copiers equipped with image scanning, image forming, and communication capabilities.

The image forming apparatuses used for outputting computerized documents charge a photoreceptor and then later clean the photoreceptor using alternating current (AC). However, AC transformers are expensive and large. Therefore, in order to reduce the cost and make the apparatus compact, typically a transformer is used that is compact and inexpensive and outputs alternating direct-current (DC) waveforms of different values to replicate a pseudo-AC waveform.

Alternatively, in order to further reduce the cost, a single transformer is used to produce a multi-purpose pseudo-AC waveform, in which the pseudo-AC waveform is used as is for one purpose or rectified and used as the DC waveform for another purpose.

One technique to generate a stable AC waveform, for example, involves clamping the AC voltage, input to an amplified circuit, at a constant voltage, so that the amplitude of the voltage after being raised can be stabilized by a relatively simple configuration.

In above-described method to rectify the pseudo-AC waveform to the DC waveforms, only one DC voltage that is half the total amplitude of the pseudo-AC waveform can be generated. For example, even when substantially the same voltage is required for the amplitude of the pseudo-AC waveform and for the DC voltage, the desired DC voltage cannot be generated from the desired amplitude of the pseudo-AC waveform.

BRIEF SUMMARY

In one aspect of this disclosure, there is provided a novel power supply circuit including a voltage regulator and a first rectifier circuit. A first high voltage is supplied to the voltage regulator and the first rectifier circuit. The power supply circuit operates at constant voltage and regulates the supplied first high voltage. The first rectifier circuit connected in parallel to the voltage regulator, to rectify the supplied first high voltage for output as a first DC voltage. When the first high voltage is a pseudo-alternating-current (AC) voltage consisting of two types of high voltages that alternate, the voltage regulator regulates each of the two different types of the voltages to output a desired pseudo-AC voltage.

In another aspect of this disclosure, there is provided a novel image forming apparatus including an image forming section, an arithmetic device, a power control circuit, and a power supply circuit. The image forming section forms image, using electrophotographic method. The arithmetic device conducts information processing to generate at least one software control signals. The power control circuit generates at least one high voltage including a direct current voltage and/or a pseudo-alternating-current (AC) voltage consisting of two types of high voltages that alternate, based on the software control signal from the arithmetic device. The power supply circuit receives the high voltage from the power control circuit and supplies power to the image forming section. The power supply circuit includes a voltage regulator and a first rectifier circuit. A first high voltage generated in the power control circuit is supplied to the voltage regulator and the first rectifier circuit. The voltage regulator operates at a constant voltage and regulates the supplied first high voltage. The first rectifier circuit is connected in parallel to the voltage regulator, to rectify the supplied first high voltage for output to the image forming section as a first DC voltage. When the first high voltage is the pseudo-AC, the voltage regulator regulates each of the two different types of the voltages to output a desired pseudo-AC voltage to the image forming section.

In another aspect of this disclosure, there is provided a novel method for supplying power to an image forming section in an image forming apparatus, comprising the steps of: inputting a first high voltage of a pseudo-alternating-current (AC) voltage consisting of two types of high voltages that alternate; regulating each of the two different types of the high voltages in the first high voltage of the pseudo-AC voltage; outputting the regulated voltage to the image forming section as a desired pseudo-AC voltage; rectifying the first high voltage of the pseudo-AC voltage; and outputting the rectified voltage to the image forming section as a first DC voltage.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result. Referring now to the drawings, wherein like reference numerals designate identical or corresponding parts throughout the several views thereof, and particularly to FIG. 1, an image forming apparatus that is an electrophotographic printer (hereinafter referred to as a printer) according to an illustrative embodiment of the present disclosure is described. In this disclosure, an image forming apparatus 1 is described using multifunction peripherals (MFP). It is to be noted that the configuration of the present specification is not limited to that shown in FIG. 1. For example, the configuration of the present specification may be adapted to the MFP as an electrophotographic image forming device as well as other types of image forming apparatuses, such as copiers, printers, and facsimile machines, and the like.

Figure 1:
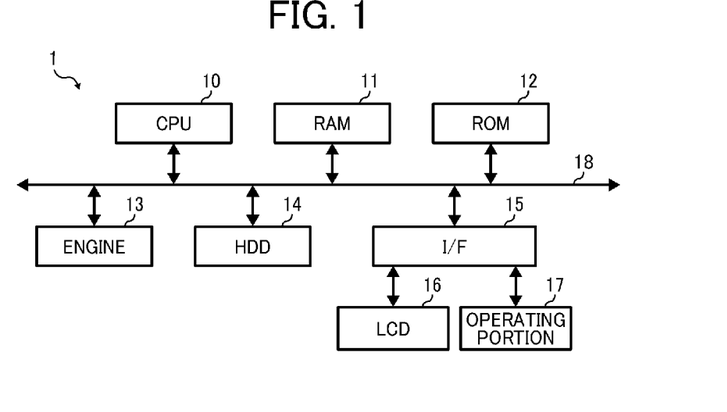
FIG. 1 is a schematic block diagram illustrating a hardware configuration of an image forming apparatus according to the present disclosure.

FIG. 1 is a block diagram illustrating a hardware configuration of an image forming apparatus 1 according to a first embodiment. As illustrated in FIG. 1, the image forming apparatus 1 includes an engine to perform image forming, in addition to information processing terminals such as a general server and a personal computer (PC). More specifically, in the image forming apparatus 1, a central processing unit (CPU) 10, a random access memory (RAM) 11, a read only memory (ROM) 12, an engine 13, a hard disk drive (HDD) 14, and an interface (I/F) 15 are connected via a bus 18. The I/F 15 is connected to a liquid crystal display (LCD) 16 and an operating portion 17.

The CPU 10 is an arithmetic device that controls overall operation of the image forming apparatus 1. The RAM 11 is volatile memory that can read and write information at high speed, which is used as a work area when the CPU 10 processes information. The ROM 12 is a read-only non-volatile memory that stores programs such as firmware. The engine 13 is a mechanism that actually performs image formation in the image forming apparatus 1.

The HDD 14 is a non-volatile memory that can read and write information and stores the operating system (OS), a variety of control programs, and applications. The I/F 15 is connected between the bus 18 and a variety of hardware and networks. The LCD 16 is a visual user interface for users to confirm the state of the image forming apparatus 1. The operating portion 17 is a user interface, such as a keyboard and a mouse, for inputting information to the image forming apparatus 1.

With this hardware configuration, programs stored in the ROM 12 and the HDD 14, or an optical disk (not shown), are read by the RAM 11. The CPU 10 operates in accordance with the programs, which constitutes a software controller. By combining the software controller and the hardware configuration, a functional block is formed that implements the capabilities of the image forming apparatus 1 according to the present embodiment.

Figure 2:
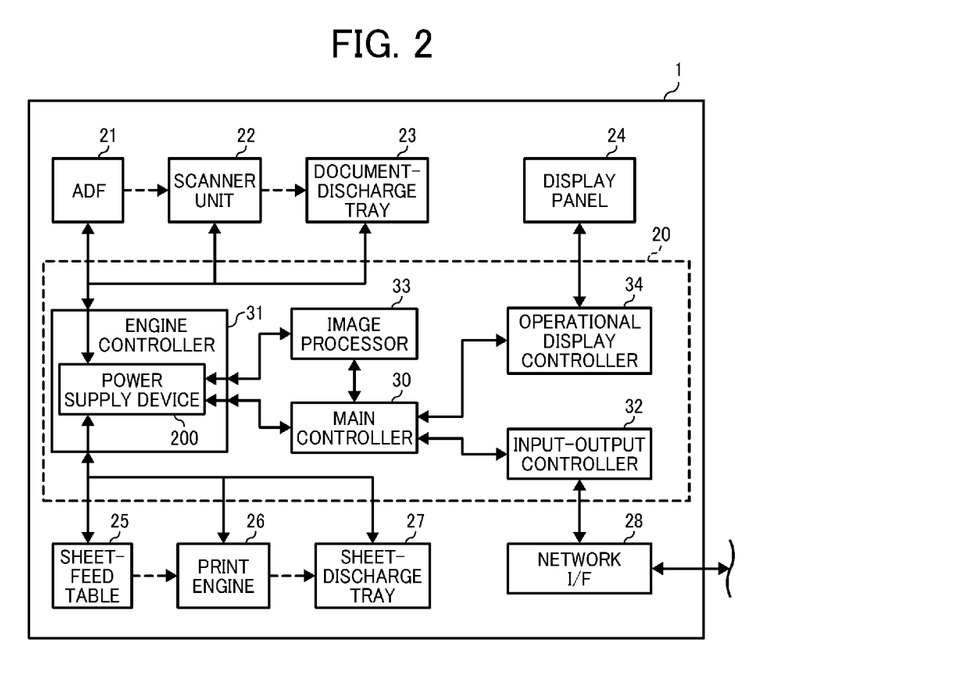
FIG. 2 is a functional block diagram of the image forming apparatus shown in FIG. 1.

Next, with reference to FIG. 2, functional configuration of the image forming apparatus 1 is described below. FIG. 2 is a block diagram illustrating a functional configuration of the image forming apparatus 1. In FIG. 2, the image forming apparatus 1 includes a control unit 20, an auto document feeder (ADF) 21, a scanner unit 22, a document-discharge tray 23, a display panel 24, a sheet-feed table 25, a print engine 26, a sheet-discharge tray 27, and a network interface (I/F) 28.

The control unit 20 includes a main controller 30, an engine controller 31, an input-output controller 32, an image processor 33, and an operational display controller 34. As illustrated in FIG. 2, the image forming apparatus 1 is formed by a multi function peripheral (MFP) including the scanner unit 22 and the print engine 26. In FIG. 2, solid line arrows indicate electrical connection and broken line arrows indicate flow of the sheet (document) of the image forming apparatus 1.

The display panel 24 serves as an output interface to visually display the state of the image forming apparatus 1 and as an input interface as a touch panel when the user directly operates the image forming apparatus 1 or an input interface (operating portion) when the information is input to the image forming apparatus 1 (electrically). The network I/F 28 is an interface that enables the image forming apparatus 1 to communicate with other devices via a network. The network I/F 28 may be Ethernet (trademark) and universal serial bus (USB) interface.

The control unit 20 is constituted by a combination of software and hardware. More specifically, control programs stored in the ROM 12, the HDD 14, and the optical disk (not shown) are read into the RAM 11, and the software control unit, constituted in accordance with the control of the CPU 10, and hardware, such as an integrated circuit, form the control unit 20. The control unit 20 functions as a controller that controls the overall operation of the image forming apparatus 1.

The main controller 30 controls respective portions included in the control unit 20 and commands the portions in the control unit 20 to do something. The engine controller 31 serves as a driver to control and drive the print engine 26 and the scanner unit 22. The input-output controller 32 inputs signals and commands input via the network I/F 28, to the main controller 30. The main controller 30 controls the input-output controller 32 and accesses the other devices via the network I/F 28.

The image processor 33 generates drawing information based on print information contained in an input print job, controlled by the main controller 30. The drawing information is the information used to draw the image to be formed in an image forming operation in the print engine 26 (image forming section). That is, the drawing information is pixels constituting the image to be output. In addition, the printing information contained in the print job is image information converted into perceptible form to be read in the image forming apparatus 1, converted by a print driver installed in the information processor such as PC. The operational display controller 34 displays the information on the display panel 24 or reports the information input via the display panel 24 to the main controller 30.

When the image forming apparatus 1 is operated as a printer, initially, the input-output controller 32 receives the print job via the network I/F 28. The input-output controller 32 transmits the received print job to the main controller 30. When receiving the print job, the main controller 30 controls the image processor 33 so that the image processor 33 generates the drawing information based on printing information contained in the print job.

When the image processor 33 generates the drawing information, the engine controller 31 performs the image formation to a sheet 104 transported from the sheet-feed table 25 based on the drawing information. That is, the print engine 26 functions as the image forming section. The sheet 104 onto which the image is formed by the print engine 26 is discharged to the sheet-discharge tray 27.

Figure 3:
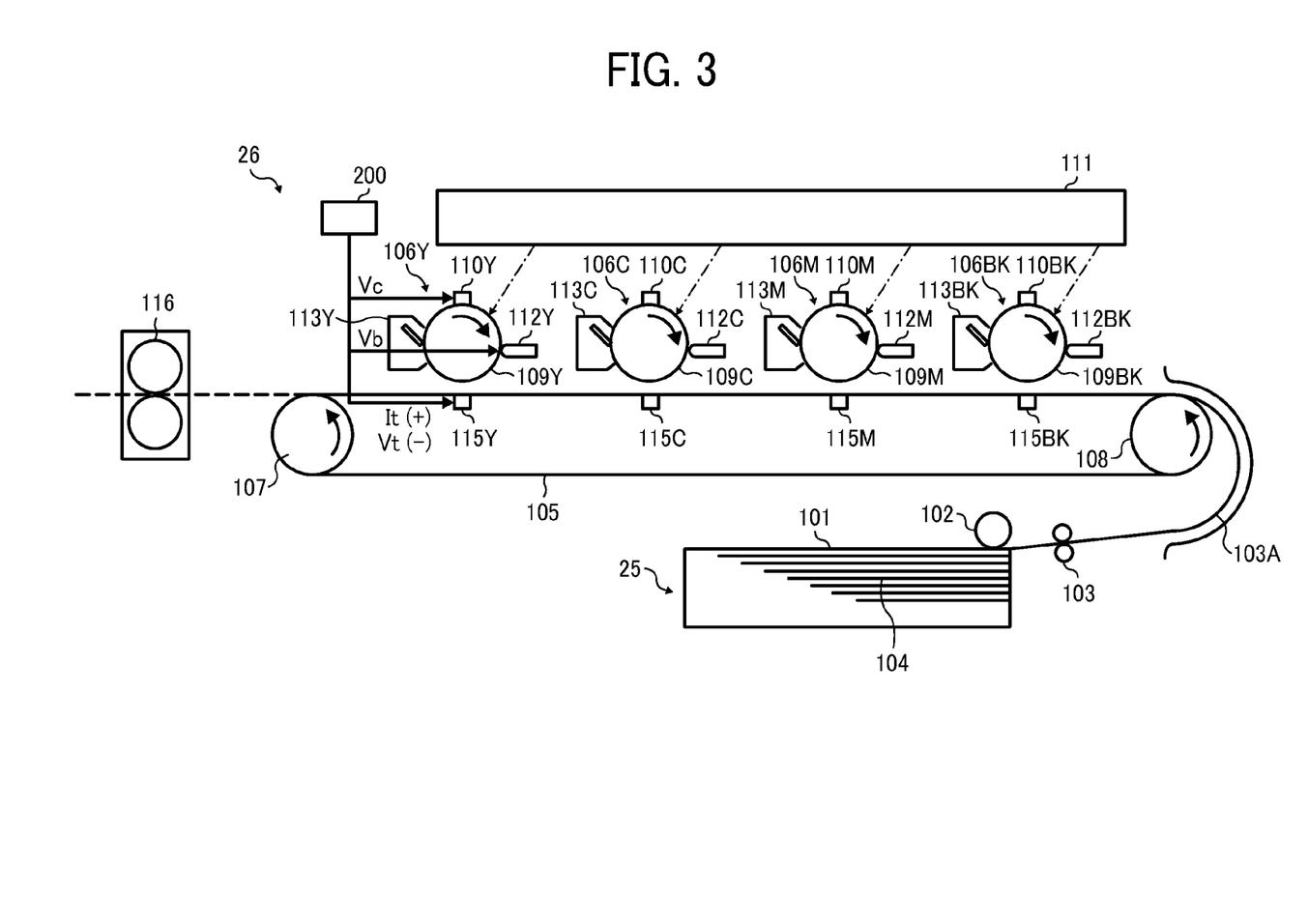
FIG. 3 is a schematic diagram of a configuration of a print engine of the image forming apparatus shown in FIG. 1.

Next, a configuration of the print engine 26 according to the present disclosure is described with reference to FIG. 3. As illustrated in FIG. 3, the print engine 26 includes a configuration in which, respective color image forming units 106 are arranged along a transport belt (seamless movement member) 105, which is called tandem type. A sheet-feed tray 101 contains recording media (sheets) 104. The sheet-feed table 25 includes the sheet-feed tray 101 and a sheet-feed roller 102. The sheet-feed roller 102 and a separation roller 103 feed and separate the sheets 104, and then the sheet 104 is transported by the transport belt 105. Along the transport belt 105, multiple image forming units 106Bk, 106M, 106C, and 106Y are arranged in this order from upstream to downstream.

These multiple image forming units 106Bk, 106M, 106C, and 106Y are only different in the color of toner image to be formed, and the internal structures thereof are common. The image forming unit 106Bk forms black image, the image forming unit 106M forms magenta image, the image forming unit 106C forms cyan image, and the image forming unit 106Y forms yellow image respectively.

It is to be noted that the suffixes Bk, M, C, and K indicate only that components indicated thereby are used for forming black, magenta, cyan, and yellow images, respectively. Each of the image forming units 106Bk, 106M, 106C, and 106Y has the same basic configuration, differing only in the color of toner used therein as an image forming material. Using the image forming unit 106Bk purely as an example, the configuration of the image forming units 106M, 106C, and 106Y is described in further detail below.

The transport belt 105 is an endless belt wound around a driving roller 107 and a driven roller 108. The driving roller 107 is driven and rotated by a driving motor. The driving motor, the driving roller 107, and the driven roller 108 function as a driving mechanism to move the transport belt 105. Four transfer members 115Bk, 115M, 11C, and 11Y are disposed inside the loop formed by the transport belt 105, opposite the photoconductive drum 109Bk, 109M, 109C, and 109Y.

During the image forming processes, the initial image forming unit 106Bk transfers the black toner image onto the sheet 104 onto the rotated transport belt 105. The image forming unit 106Bk includes a photoconductive drum (photoreceptor) 109Bk, and a charger 110Bk, a development device 112Bk, a photoreceptor cleaner (not shown), and a discharger 113Bk are arranged on the photoconductive drum 109Bk. An optical writing device 111 are disposed so that light emitted from the optical writing device 111 exposes surfaces of the respective photoconductive drums 109Bk, 109M, 109C, and 109Y.

In image forming operation, the outer circumferential surface of the photoconductive drum 119Bk is charged uniformly by the charger 110Bk and is written by the light from a light source, corresponding to the black image, from the optical writing device 111. At this time, the charger 110Bk applies a charging voltage (Vc) to the surface of the photoconductive drum 119Bk. Thus, electrostatic latent image is formed on the surface. The development device 112Bk applies a developing bias (Vb) to visualize the electrostatic latent image formed on the photoconductive drum 119Bk to black toner image. Thus, the black toner image is formed on the surface of the photoconductive drum 109Bk.

The transfer member 115Bk applies a transfer bias (Vt(−)) to form transfer electric field to transfer the toner image onto the transport belt 105 in a transfer position where the photoconductive drum 109Bk contacts or is most adjacent to the transport belt 105. Transferring the toner image, the black toner image is formed on the sheet 104 transported by the transport belt 105.

The photoconductive drum 109Bk after transferring the toner image is finished, the residual toner on the outer surface of the photoconductive drum 109Bk is removed by the photoreceptor cleaner, and discharged by the discharger 113Bk, and then the image forming unit 106Bk enters a standby mode to wait for next image formation. The toner remained in the transport belt 105 transfened from the photoconductive drum 109Bk is returned to the photoconductive drum 109Bk by a cleaning bias (It(−)) applied from the transfer member 115Bk, and then is removed by the photoreceptor cleaner.

As described above, the sheet 104 on which the toner image is transfened by the image forming unit 106Bk is transported to the subsequent image forming unit 106M by rotating the transport belt 105. In the image forming unit 106M, by performing the image forming process similar to the image forming process of the image forming unit 106Bk, a magenta toner image is formed on the photoconductive drum 109M, and then, the toner image is superimposed on the black toner image.

The sheet 104 on which the composite of black and magenta toner image is formed is transported to the subsequent image forming units 106C and 106Y, and under similar image forming operation, a cyan toner image formed on the photoconductive drum 109C is transferred and superimposed on the transferred magenta toner image of the composite, and an yellow toner image formed on the photoconductive drum 109Y is transfened and superimposed on the transferred cyan image of the composite. Thus, the multiple color intermediate transfened image is formed on the sheet 104 transported by the transport belt 105.

It is to be noted that, although the transfer bias and the cleaning bias are applied to transfer members 115 in a direct-transfer mechanism in which the transfer members 115 form transfer electric field to directly transfer the toner image on the photoconductive drum 109Bk onto the sheet 104 on the transport belt 105 in FIG. 3, alternatively, the transfer bias and the cleaning bias may be applied to primary transfer members and a secondary transfer member in a intermediate-transfer mechanism (not shown) in which the toner image on a photoconductive drum is primary transfened on a transfer belt (by the primary transfer members) and the toner image on the transfer belt is secondary transferred on the sheet P on a transport belt (by the secondary transfer member).

The sheet 104 stocked in the sheet-feed tray 101 is sent from top and the sheet 104 is transported by being electro-statically attracted to the transport belt 105 in the position where a transport path 103A contacts or is most adjacent to the transport belt 105. Thus, the sheet 104 is transported by the transport belt 105 and then the image is formed on the sheet 104. The sheet 104 on which the image is formed is further transported to a fixing device 116. The image on the sheet 104 is fixed in place with heat and pressure by the fixing device 116, and then discharged outside of the image forming apparatus 1.

In above-described image forming process, the charging voltage applied by the charger 111, the transfer bias applied by the development device 112, and the transfer bias and the cleaning bias applied by the transfer member 115 are generated using a power supply device 200.

The configuration of the power supply device 200 that generates above-described voltages is described below with reference to FIG. 4. The power supply device 200 generates the charging voltage Vc of the charger 110, the developing bias Vb of the development device 112, and the transfer bias It(+) and the cleaning bias It(−) of the transfer member 115 based on software control signals $CNTRL_{Vc}$, $CNTRL_{Vb}$, and $CNTRL_{It}$ to control at pulse width modulation (PWM).

Figure 4:
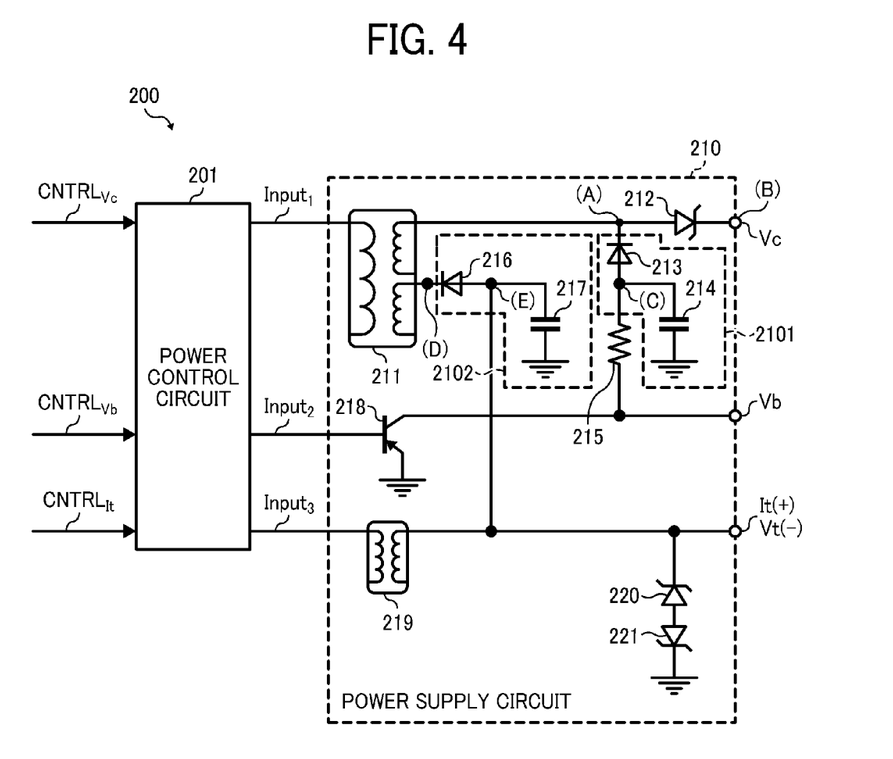
FIG. 4 is a circuit diagram illustrating a configuration of a power supply circuit in the image forming apparatus shown in FIG. 1.

As illustrated in FIG. 4, the power supply device 200 according to the present disclosure includes a power control circuit 201 and a power supply circuit 210. The power control circuit 201 outputs voltages $Input_1$, $Input_2$, and $Input_3$ of the pseudo-AC voltage wave and/or the DC voltage that generates the respective voltages Vc, Vb, Vt, and It, based on the software control signals $CNTRL_{Vc}$, $CNTRL_{Vb}$, and $CNTRL_{It}$.

Herein, the above-described software control signals $CNTRL_{Vc}$, $CNTRL_{Vb}$, and $CNTRL_{It}$ are controlled by an arithmetic device such as the CPU 10. That is, the power supply device 200 is connected to an information processing system, such as the CPU10, RAM11, ROM12 shown in FIG. 1, and operates in accordance with the software control executed by the information processing system.

Based on the pseudo-AC voltage and the DC voltage input from the power control circuit 201, the power supply circuit 210 generates the respective voltages for output. As illustrated in FIG. 4, the power supply circuit 210 includes a transformer 211, a voltage regulator Zener diode 212, a first rectification diode 213, a rectification capacitor 214, a dividing resistor 215, a second rectification diode 216, a rectification capacitor 217, a dividing transistor 218, a transformer 219, and clamp Zener diodes 220 and 221.

The transformer 211 is a first booster circuit to raise (boost) the input voltage $Input_1$ input from the power control circuit 201. The transformer 211 includes two output terminals; one terminal is connected to an anode of the voltage regulator Zener diode 212 and a cathode of the first rectification diode 213. The other output terminal of the transformer 211 is connected to a cathode of the rectification diode 216. The other input and output terminals of the transformer 211 are connected to a system ground (not shown).

Figure 5A:
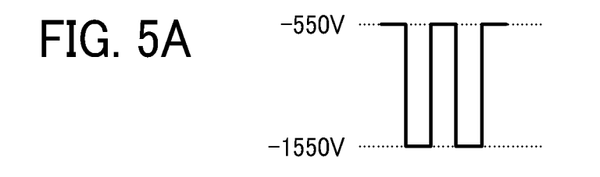
FIGS. 5A through 5E are graphs illustrating signals at respective points in the power supply circuit shown in FIG. 4.

When the input voltage $Input_1$ is a voltage having the pseudo-AC waveform, a voltage at a junction node A that is an output of the transformer 211 on the voltage regulator Zener diode 212 side is a waveform like that shown in FIG. 5A. In order to form the input voltage $Input_1$ of the pseudo-AC waveform, the CPU 10 outputs the signal $CNTRL_{Vc}$ so that the power control circuit 201 outputs the pseudo-AC waveform as the input voltage $Input_1$.

As described above, the control signal $CNTRL_{Vc}$ is a PWM signal. Accordingly, in accordance with a duty ratio of the control signal $CNTRL_{Vc}$ of the PWM signal, the power control circuit 201 outputs the pseudo-AC voltage and the DC voltage as the input voltage $Input_1$. That is, based on a timing to output the pseudo-AC voltage to generate the voltage Vc, that is, whether or not the photoconductive drums 109 are charged in the image forming processing, the CPU 10 outputs the control signal $CNTRL_{Vc}$ to have a desired duty ratio. It is to be noted that, the case in which the output voltage Vc is the DC voltage is described in later.

The voltage regulator Zener diode 212 is a diode to drive voltage constantly, and is connected so that a reverse bias is applied based on an output voltage of the transformer 211. With this operation, the voltage regulator Zener diode 212 functions as a voltage regulator to regulate a certain voltage from the output voltage of the transformer 211.

More specifically, when a high voltage is applied to a cathode of the voltage regulator Zener diode 212 and a low voltage is applied to an anode thereof, the current does not flow until the voltage reaches an operating voltage of the voltage regulator Zener diode 212, the current flows once the voltage exceeds the operating voltage thereof. With these characteristics, the voltage regulator Zener diode 212 regulates the operating voltage of the voltage at a point (junction node) A as the output voltage of the transformer 211 and outputs the regulated voltage Vc.

Figure 5B:
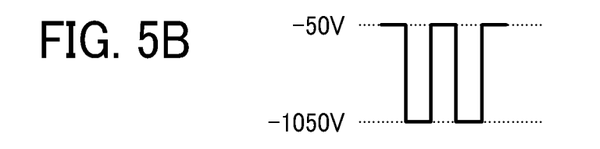

When the waveform of the voltage at the point A is the pseudo-AC waveform shown in FIG. 5A, the voltage Vc at a point B regulated and output by the voltage regulator Zener diode 212 is illustrated as FIG. 5B. That is, in the example of FIG. 4, the operating voltage of the voltage regulator Zener diode 212 is set to 500 V, and the voltage regulator Zener diode 212 regulates the voltage of 500 V.

The rectification diode 213 and the rectification capacitor 214 rectify the pseudo-AC waveform output from one terminal of the transformer 211 for output as the DC voltage, and thus function as a first rectifier circuit 2101. Similarly, the rectification diode 216 and the rectification capacitor 217 rectify the pseudo-AC waveform output from another terminal of the transformer 211 for output the DC voltage, and thus function as a second rectifier circuit 2102.

Figure 5C:
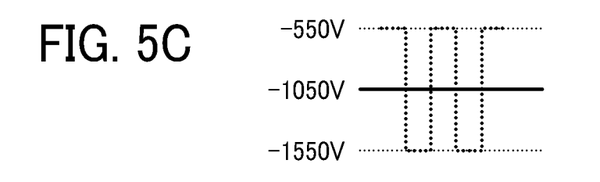

When the waveform at the point A is the pseudo-AC waveform shown in FIG. 5A, the voltage at a point C rectified by the rectification diode 213 and the rectification capacitor 214 is a DC voltage, shown in FIG. 5C, having half the amplitude of the waveform shown in FIG. 5A.

The dividing resistor 215, serving as a fixed resistor, and the dividing transistor 218, serving as a variable resistor, are connected in series and together function as a dividing circuit to divide the DC voltage at the point C rectified by the rectification diode 213 and the rectification capacitor 214. The input voltage $Input_2$ of the DC voltage from the power control circuit 201 is input to a base of the dividing transistor 218, an emitter of the dividing transistor 218 is connected to a system ground, and a collector thereof is connected to the one end of the dividing resistor 215.

Accordingly, the current flowing from the emitter to a collector of the dividing transistor 218 is determined by the input voltage $Input_2$, and as a result, the voltage to be divided is determined by the dividing circuit constituted by the dividing resistor 215 and the dividing transistor 218. The voltage divided by the dividing circuit is output as an output voltage Vb.

The input voltage $Input_2$ is determined by the control signal $CNTRL_{Vb}$ input from the CPU 10 via the power-supply control circuit 201. As described above, the control signal $CNTRL_{Vb}$ is the PWM signal, and the power control circuit 201 outputs the voltage $Input_2$ in accordance with the duty ratio of the control signal $CNTRL_{Vb}$. That is, the CPU 10 outputs the control signal $CNTRL_{Vb}$ having a duty ratio in accordance with the desired dividing ratio.

Another terminal of the transformer 211 connected to the cathode of the rectification diode 216 is an output terminal converted by different secondary wiring from the output connected to the voltage regulator Zener diode 212. When the input voltage $Input_1$ is the pseudo-AC waveform, the waveform at a point D output from another output terminal of the transformer 211 is the pseudo-AC waveform shown in FIG. 5D.

Figure 5D:
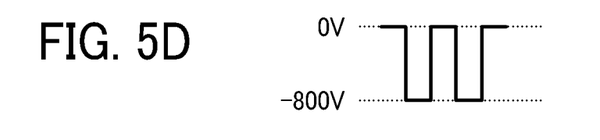
Figure 5E:
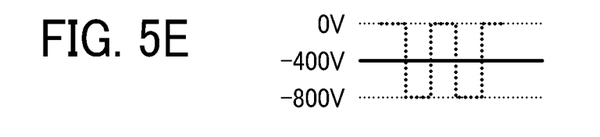

Then, when the waveform at the point D is the pseudo-AC waveform shown in FIG. 5D, the voltage at a point E rectified by the rectification diode 216 and the rectification capacitor 216 is the DC voltage shown in FIG. 5E, having half the amplitude of the voltage at the point D shown in FIG. 5D.

The transformer 219, serving as booster, raises the input voltage $Input_3$ from the power control circuit 202 for output. The voltage of the output of the transformer 219 is stabilized by the clamp Zener diodes 220 and 221 constituting the clamp circuit, and output as a constant current It (+). The other terminals of the transformer 211, not shown, are connected to the system ground.

Another output terminal of the transformer 219 is connected to output of the DC voltage at the point E rectified by the rectification diode 216 and the rectification capacitor 217. When the voltage Input$_3$ is not input, the DC voltage at the point E is output as the voltage Vt(−). In other words, the output of the DC voltage rectified by the rectification diode 216 and the rectification capacitor 217 shares the output of the transformer 219. Similarly above, when the voltage Vt (−) is output, the voltage is stabilized by the clamp circuit constituted by the clamp diodes 220 and 221.

Whether the power control circuit 201 outputs the voltage Input$_3$ or not is determined by the control signal CNTRL$_{Jt}$ input from the CPU 10. As described above, the control signal CNTRL$_{Jt}$ is the PWM signal, and the power control circuit 201 outputs the voltage Input$_3$ in accordance with the duty ratio of the control signal CNTRL$_{Jt}$ as the PWM signal.

It is to be noted that, the power control circuit 201 determines whether the voltage Input$_3$ is output in accordance with the duty ratio of the control signal CNTRL$_{Jt}$. Alternatively, the power control circuit 201 may simply output the voltage Input$_3$ when the control signal CNTRL$_{Jt}$ is input. In this case, the CPU 10 switches whether the voltage Input$_3$ is output or not depending on whether the apparatus is in the process of transferring the toner image onto the sheet 104 or in the process of moving the toner from the transport belt 105 to the photoconductive drum 109.

As illustrated in FIG. 4, as the clamp circuit, the anode of the clamp Zener diode 220 and the cathode of the clamp Zener diode 221 are connected. That is, the two Zener diodes 220 and 221 are connected each other in opposite directions. The rectification circuit, constituted by the rectification diode 216 and the rectification capacitor 217, for rectifying the transformer 219, and the output of the transformer 219 are connected to the cathode of the clamp Zener diode 220.

More specifically, the clamp Zener diode 220 is an element to clamp the voltage Vt(−), and the clamp Zener diode 221 is an element to clamp the current It (+).

Above-described operation is the circuit condition to obtain the pseudo-AC waveform as the voltage Vc. With this operation, the power supply circuit 210 generates and supplies the charging voltage Vc to the chargers 110, the developing bias Vb to the development devices 112, and the transfer bias It(+) and the cleaning bias Vt(−) to the transfer members 115.

On the other hand, when the output of the image forming corresponding to one print job is finished, and before the print job is performed, the charging charge on the photoconductive drum 109 is uniformed to avoid the unevenness of the image density, and the cleaning control to apply the cleaning bias to remove the residual toner photoconductive drum 109 is executed. At this time, the DC voltage is supplied as the output voltage Vc. When the voltage Input$_1$ is set at the DC voltage, the output voltage Vc is the DC voltage.

More specifically, when the input voltage Input$_1$ is the DC voltage, the outputs from the transformer 211 are the DC voltage. In the outputs of the transformer 211, the one voltage at the point A connected to the voltage regulator Zener diode 212 and the rectification diode 213 is regulated to 500 V uniformly by the voltage regulator Zener diode 212, similarly above, for output the DC voltage as the output voltage Vc.

In addition, when the voltage at the point A is the DC voltage, the rectification diode 213 and the rectification capacitor 214 do not operate, and the voltage at the point C is identical to the DC voltage at the point A. Then, the voltage at the point C is divided by the dividing resistor 215 and the dividing transistor 218, and then is output as the voltage Vb.

Further, in the outputs of the transformer 211, when the voltage at the point D, connected to the rectification diode 216, is the DC voltage, the rectification diode 216 and the rectification capacitor 217 do not operate, and the voltage at the point E is identical to the DC voltage at the point D. Then, the voltage at the point E is clamped by the clamp Zener diode 220 and output as an output voltage Vt (−).

The case in which the input voltage Input$_1$ is the DC voltage is the case of the intervals of the print job, and during the cleaning processing; at this time, the transfer bias is not necessary. Therefore, the input voltage Input$_3$ is not input, and accordingly, the power corresponding to the current It(+) is not supplied but the voltage Vt (−) is output.

When the input voltage Input$_1$ is the pseudo-AC waveform, the output at the point D of the transformer 211 is the pseudo-AC waveform. When the input voltage Input$_1$ is the DC voltage, the output at the point D of the transformer 211 is the DC voltage. Therefore, if the clamp Zener diode 220 is not connected, the voltage at the point E may fluctuate based on whether the input voltage Input$_1$ is the pseudo-AC voltage or the DC voltage. By connecting the clamp Zener diode 220, both when the input voltage Input$_1$ is the pseudo-AC voltage and the DC voltage, the voltage Vt(−) can be kept constant.

As described above, the power supply circuit 210 according to the present disclosure raises the input voltage Input$_1$ as the original pseudo-AC waveform input for the output voltages Vc and Vb to generate the high voltages. Then, by rectifying the pseudo-AC voltage by the rectification diode 213 and the rectification capacitor 214, the desired DC voltage can be obtained as the output voltage Vb.

That is, to obtain the amplitude of the desired DC voltage as the amplitude of the pseudo-AC waveform after raised by the transformer 211, the value of the value of the input voltage Input$_1$ and raising ratio in the transformer 211 are adjusted. More specifically, as illustrated in FIGS. 5A and 5C, the amplitude after raised by the transformer 211 is adjusted so that the amplitude is set as twice as the desired DC voltage.

On the other hand, when the pseudo-AC waveform is picked up from the outputs of the transformer 211, the pseudo-AC waveform output from the transformer 211 is the high voltage raised in accordance with the output voltage Vb. Accordingly, by regulating the voltage by the voltage regulator Zener diode 212, the amplitude of the desired pseudo-AC waveform is obtained.

For the purpose of regulating voltage, instead of using the Zener diode 212 as the voltage regulator it is possible to divide the voltage by the dividing resistor 215 and the dividing transistor 218. However, as described above, since the voltage at the point A is a high resistance is required of the element(s) of such a voltage regulator.

In general, a Zener diode is less expensive than the rectification circuit constituted by a diode and capacitor to form the high resistance element. Using the Zener diode as the element to regulate the amplitude of the pseudo-AC waveform, simple configuration can be achieved.

When the voltage is regulated by dividing, in order to regulate so that the voltage is kept constant, it is necessary to automatically adjust the dividing ratio in accordance with the voltage at the point A to adjust the input voltage Input$_2$ input to a base terminal of the dividing transistor 218, which increases the size of the circuit, and control of the circuit becomes complex. Conversely, by using the Zener diode, without performing any control process, the voltage can be always regulated to a constant voltage, and the purpose is achieved by a small circuit size and a simple operation.

Numerous additional modifications and variations are possible in light of the above teachings. It is therefore to be understood that, within the scope of the appended claims, the disclosure of this patent specification may be practiced otherwise than as specifically described herein.

What is claimed is:

1. A power supply circuit comprising:
   a voltage regulator to which a first high voltage is supplied, to operate at a constant voltage and regulate the supplied first high voltage; and
   a first rectifier circuit to which the first high voltage is supplied, connected in parallel to the voltage regulator, to rectify the supplied first high voltage for output as a first DC voltage,
   wherein, when the first high voltage is a pseudo-alternating-current (AC) voltage consisting of two types of high voltages that alternate, the voltage regulator regulates each of the two different types of the voltages to output a desired pseudo-AC voltage.

2. The power supply circuit according to claim 1, wherein the voltage regulator comprises a Zener diode connected so that a reverse bias is applied when the first high voltage is supplied.

3. The power supply circuit according to claim 1, further comprising:
   a first booster circuit, having multiple output terminals to supply multiple voltages having different boosting ratios, one of the multiple output terminals being connected to the voltage regulator and the first rectifier circuit to supply the first high voltage to the voltage regulator and the first rectifier circuit;
   a second rectifier circuit to which a second high voltage different from the first high voltage is supplied from another of the multiple output terminals of the first booster circuit, to rectify the supplied second high voltage for output as a second DC voltage; and
   a first clamp element to clamp the rectified second DC voltage output from the second rectifier circuit.

4. The power supply circuit according to claim 3, further comprising
   a second booster circuit, having an output terminal connected to a junction node having the rectified second DC voltage output from an output terminal of the second rectifier circuit,
   wherein an output voltage from the second booster circuit and the rectified second DC voltage from the second rectifier circuit share a common output route from the junction node.

5. The power supply circuit according to claim 4, further comprises
   a second clamp element to clamp a voltage at a constant-current whose charge is opposite of the rectified second DC voltage from the second rectifier circuit, when the common output route, shared by the output voltage from the second booster circuit and the rectified second DC voltage from the second rectifier circuit, has the voltage at the constant current whose charge is opposite of the rectified second DC voltage from the second rectifier circuit.

6. The power supply circuit according to claim 5, wherein the first clamp element to clamp the rectified second DC voltage and the second clamp element to clamp the charge-reversed rectified second DC voltage together function as a clamp circuit that includes two Zener diodes connected in opposite directions each other,
   wherein one end of the connected Zener diodes is connected to the common output route through which the rectified second DC voltage from the second rectifier circuit and the output voltage from the second booster circuit are output.

7. The power supply circuit according to claim 1, further comprising:
   a dividing circuit to divide the rectified first DC voltage for output, having a fixed resistor and a variable resistor connected in series to the fixed resistor,
   wherein a dividing ratio for dividing the rectified first DC voltage is determined by the resistance of the variable resistor whose value is determined by an externally supplied voltage.

8. An image forming apparatus, comprising:
   an image forming section to form image, using electrophotographic method;
   an arithmetic device to conduct information processing to generate at least one software control signals;
   a power control circuit to generate at least one high voltage including a direct current voltage and/or a pseudo-alternating-current (AC) voltage consisting of two types of high voltages that alternate, based on the software control signal from the arithmetic device; and
   a power supply circuit to receive the high voltage from the power control circuit and supply power to the image forming section,
   the power supply circuit comprising:
      a voltage regulator to which a first high voltage generated in the power control circuit is supplied, to operate at a constant voltage and regulate the supplied first high voltage; and
      a first rectifier circuit to which the first high voltage is supplied, connected in parallel to the voltage regulator, to rectify the supplied first high voltage for output to the image forming section as a first DC voltage,
      wherein, when the first high voltage is the pseudo-AC, the voltage regulator regulates each of the two different types of the voltages to output a desired pseudo-AC voltage to the image forming section.

9. The image forming apparatus according to claim 8,
   wherein the image forming section comprises:
      a photoreceptor to bear a toner image;
      a charger to apply a charging voltage to the photoreceptor;
      a development device to apply a developing bias to the photoreceptor to develop a latent image to the toner image;
      a transport belt to convey a recording medium;
      a transfer member to which a transfer bias is applied to form transfer electric filed to transfer the toner image onto the recording medium and to which a cleaning bias is applied to move a residual toner on the transport belt to the photoreceptor; and
      a photoreceptor cleaner to remove the remaining toner on the photoreceptor,
   wherein the power supply circuit generates at least two of the charging bias for output to the charging device, the developing bias for output to the development device, and the transfer bias and the cleaning bias for output to the transfer member based on the high voltage from the power control circuit.

10. The image forming apparatus according to claim 9, wherein the power supply circuit further comprises:
   a first booster circuit, having multiple output terminals to supply multiple voltages having different boosting ratios, one of the multiple output terminals being connected to the voltage regulator and the first rectifier circuit to supply the first high voltage to the voltage regulator and the first rectifier circuit;
   a second rectifier circuit to which a second high voltage different from the first high voltage is supplied from another of the multiple output terminals of the first booster circuit, to rectify the supplied second high voltage for output as a second DC voltage; and a first clamp element to clamp the rectified second DC voltage output from the second rectifier circuit, wherein the power supply circuit generates at least three of the charging bias, the developing bias, the transfer bias, and the cleaning bias.

11. The image forming apparatus according to claim 10, wherein the power supply circuit further comprises:

a second booster circuit, having an output terminal connected to a junction node having the rectified second DC voltage output from an output terminal of the second rectifier circuit, an output voltage from the second booster circuit and the rectified second DC voltage from the second rectifier circuit sharing a common output route from the junction node; and a second clamp element to clamp a voltage, at a constant-current, whose charge is opposite of the rectified second DC voltage from the second rectifier circuit, when the common output route, shared by the output voltage from the second booster circuit and the rectified second DC voltage from the second rectifier circuit, has the voltage at the constant current whose charge is opposite of the rectified second DC voltage from the second rectifier circuit, wherein the power supply circuit generates the charging bias, the developing bias, the transfer bias, and the cleaning bias.

12. A method for supplying power to an image forming section in an image forming apparatus, comprising the steps of:

inputting a first high voltage of a pseudo-alternating-current (AC) voltage consisting of two types of high voltages that alternate;

regulating each of the two different types of the high voltages in the first high voltage of the pseudo-AC voltage;

outputting the regulated voltage to the image forming section as a desired pseudo-AC voltage;

rectifying the first high voltage of the pseudo-AC voltage; and outputting the rectified voltage to the image forming section as a first DC voltage.

\* \* \* \* \*